Figure 3:
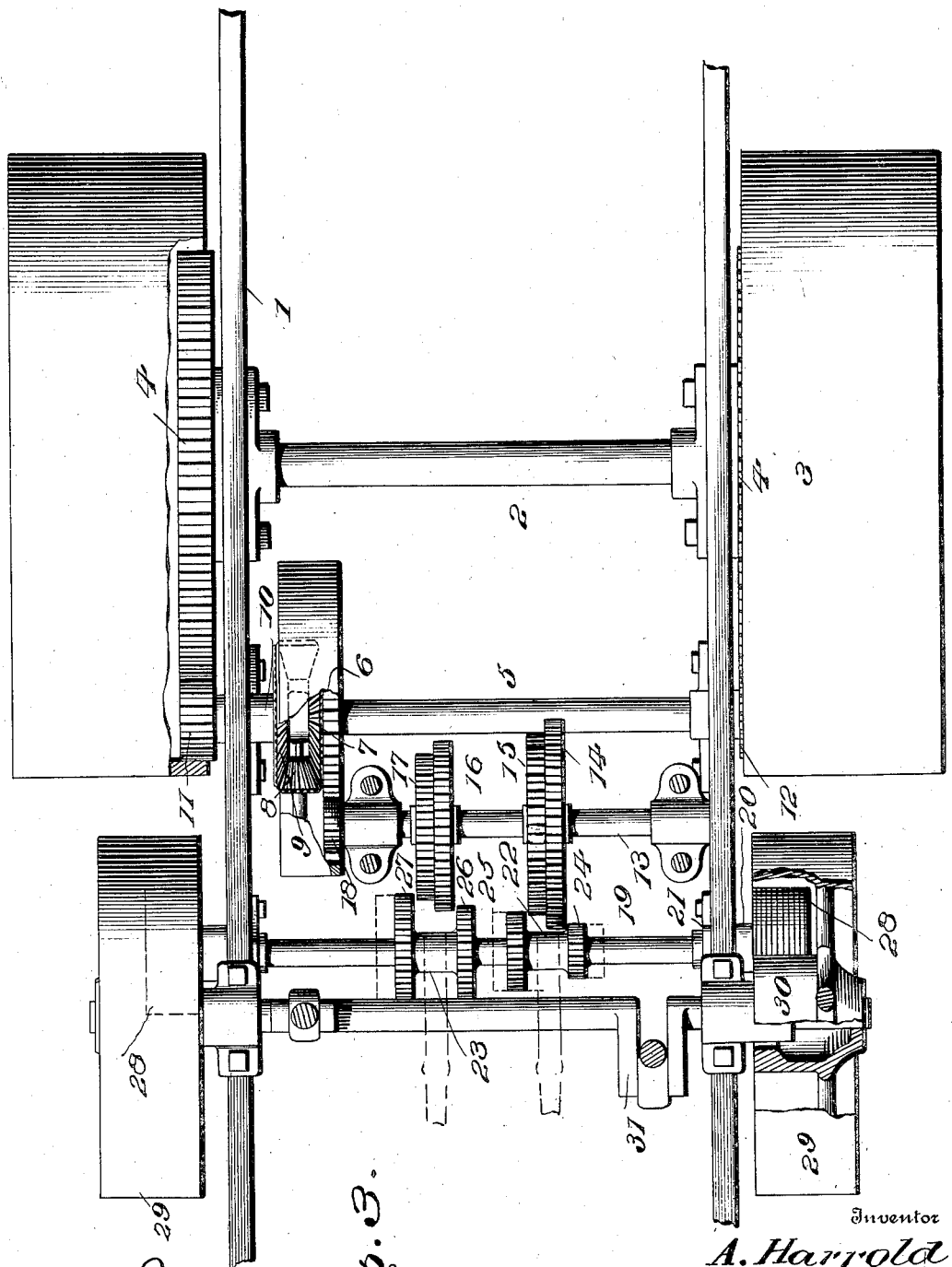

No. 850,644. PATENTED APR. 16, 1907.
A. HARROLD.
GEAR FOR TRACTION ENGINES.
APPLICATION FILED MAR. 8, 1904.
2 SHEETS—SHEET 1.
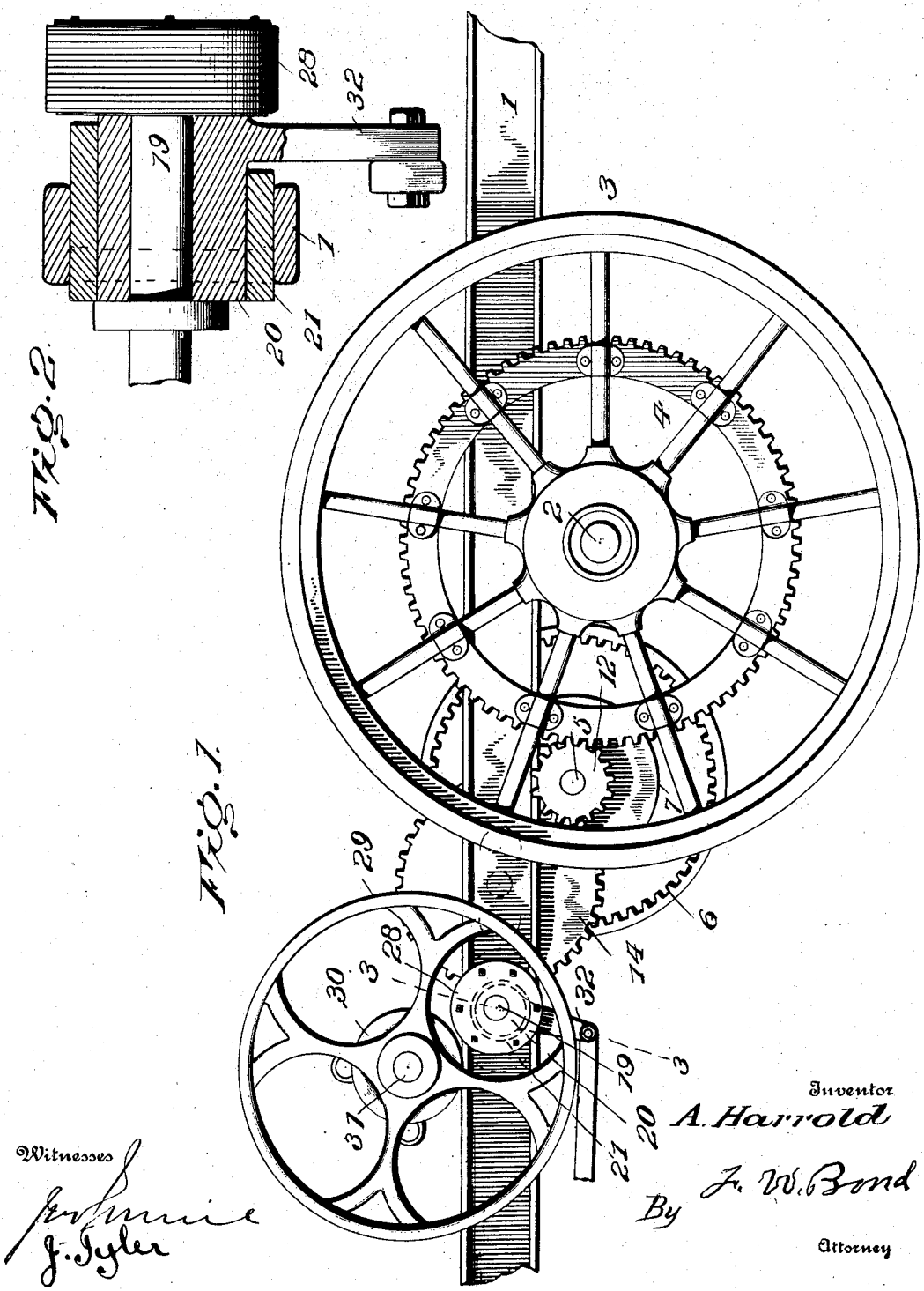
Witnesses
Inventor
A. Harrold
By J. W. Bond
Attorney No. 850,644. PATENTED APR. 16, 1907.
A. HARROLD.
GEAR FOR TRACTION ENGINES.
APPLICATION FILED MAR. 8, 1904.

2 SHEETS—SHEET 2.

Witnesses

Inventor
A. Harrold
By
J. W. Bond
Attorney

UNITED STATES PATENT OFFICE.

AMOS HARROLD, OF NEWARK, OHIO.

GEAR FOR TRACTION-ENGINES.

No. 850,644.  Specification of Letters Patent.  Patented April 16, 1907.

Application filed March 8, 1904. Serial No. 197,164.

*To all whom it may concern:*

Be it known that I, AMOS HARROLD, a citizen of the United States, residing at Newark, in the county of Licking and State of Ohio, have invented certain new and useful Improvements in Gears for Traction-Engines, of which the following is a specification.

My invention relates to improvements in gears for traction-engines, whereby different speeds are provided and frictional contact between the power-shaft and the gearing communicating motion to the propelling-axle together with certain details of construction, all of which will be fully explained by reference to the accompanying drawings, in which—

Figure 1 is a side elevation. Fig. 2 is a transverse section through line 3 3, Fig. 1. Fig. 3 is a top view showing the relation of the various gears and their arrangement.

Similar numerals of reference indicate like parts in all the figures of the drawings.

1 represents a portion of the engine-frame which may be constructed in any well-known manner, reference being had to properly attaching and locating the various parts pertaining to the present invention.

2 represents the traction-axle which is journaled to the frame in the ordinary manner. To the traction-axle 2 are attached the traction or propelling wheels 3, and to the wheels 3 are securely attached the gear-wheels 4, which gear-wheels may be attached to the spokes of the traction-wheels 3, as shown in Fig. 1; or they may be otherwise attached, inasmuch as the only object desired is to provide suitable attachment between the traction-wheels and the gear-wheels. To the frame 1 is journaled the compensating-gear shaft 5, upon which shaft is loosely mounted the internal gear-wheel 6, to the side of which is located the fixed bevel-gear 7, which bevel-gear meshes with the gear-pinion 8, which gear-pinion meshes with the loosely-mounted bevel-gear 9, said bevel-gear 9 being fixed to the sleeve 10, and upon which sleeve 10 is fixed the pinion 11, which pinion meshes with the gear-wheel 4. The parts just above described constitute what might be termed an ordinary "compensating" gear and forms no particular part of the present invention; but in order to carry out the purpose of the present invention the compensating gear must necessarily be employed.

It will be understood that upon the opposite end of the shaft 5 is securely fixed the pinion 12, which meshes with one of the gear-wheels 4. To the frame 1 is journaled the shaft 13, and upon which shaft are mounted the differentiating gear-wheels 14, 15, 16, and 17, said wheels being fixed to and rotating with the shaft 13. Upon the shaft 13 is mounted the pinion 18, which pinion meshes with the internal gear-wheel 6. The shaft 19 is journaled in the eccentric bearings 20, which eccentric bearings are supported and carried by suitable casings 21, which casings are fixed in any convenient and well-known manner to the frame 1 or its equivalent.

Upon the shaft 19 are slidably mounted the sleeves 22 and 23, and to said sleeves are securely attached or formed integral therewith the differentiating pinions 24, 25, 26, and 27, said pinions being located and arranged substantially as illustrated in the drawings and all for the purpose hereinafter described. The pinions 24 and 25 are moved in unison and likewise the pinions 26 and 27. The pinions 24, 25, 26, and 27 are so located and arranged with reference to the gear-wheels 14, 15, 16, and 17 that they can be thrown in and out of mesh at the will of the operator, by which arrangement four distinct and independent speeds are provided. It will be understood that when the pinion 24 is brought in mesh with the gear-wheel 14 the slowest speed is obtained and when the pinion 27 is brought in mesh with the gear-wheel 17 the highest speed is maintained. The other pinions and gear-wheels provide or produce various speeds between the highest and lowest. For convenience the pinions, together with their sleeves located upon the shaft 19, can be so arranged that they can all be thrown out of mesh, which is the position illustrated in Fig. 3.

Upon the shaft 19 are securely fixed the friction-wheels 28. Said friction-wheels are of the usual construction and are located between the inner surfaces of the wheels 29 and the outer surfaces of the hubs 30, which hubs are preferably formed integral with the wheels 29, said hubs and wheels being securely fixed to the power or engine shaft 31.

It will be understood that by my peculiar arrangement I am enabled to rotate the shaft 19 in opposite direction by shifting the friction-wheels 28 from contact with the inner surfaces of the wheels 29 to the outer surfaces of the hubs 30, this being accomplished by means of suitable arms 32, fixed to or formed integral with the eccentric bearings 20 and the operating-bars pivoted to the outer free ends of the arms 32. The eccentric bearings 20 are operated to throw the shaft 19 by means of a suitable operating-lever, which may be of any well-known construction and forms no particular part of the present invention and no illustration is deemed necessary.

The friction-wheels 28 may be detached or disconnected or brought out of contact with the inner surfaces of the wheels 29 and the peripheries of the hubs 30, at which time no operative connection is maintained between the engine-shaft 31 and the various gears or propelling mechanism, this being very desirable, especially in gasolene traction-engines, owing to the fact that gasolene engines cannot well be started under a load or at the time they are to perform the work designed to be accomplished.

It will be understood that when the friction-wheels are in contact with the inner surfaces of the wheels 29 the engine proper will be propelled in one direction and when said friction-wheels are brought into contact with the hub 30 the engine will be propelled in the opposite direction, by which arrangement the engine proper can be propelled forward or backward, and, as designed in the present instance, the backward movement is brought about by contact with the hubs 30, which brings about a slow movement owing to the fact that the hubs 30 are of less diameter than the diameter of the wheels 29.

For the purpose of maintaining proper mesh as between the gear-wheels 14, 15, 16, and 17 and the pinions 24, 25, 26, and 27 the mesh is maintained in a horizontal line drawn through the shafts 13 and 19, or substantially so, and substantially a vertical movement imparted to the shaft 19, by which arrangement the pinions and gear-wheels above mentioned are not thrown out of mesh at any time during the movement of the shaft 19 by means of the eccentric bearings 20.

Having fully described my invention, what I claim as new, and desire to secure by Letters Patent, is—

1. In a gear for traction-engines, the combination of a frame, an axle journaled in the frame, driven wheels secured to said wheels, a gear fixed to each of said wheels, a compensating shaft, an internal gear loosely mounted thereon, a pinion fixed to said compensating shaft and meshing with one of the gears on the driven wheels, two beveled gears mounted adjacent each other, a beveled gear carried by the internal gear interposed between said two beveled gears, a sleeve, one of said beveled gears located on the sleeve, a pinion on the sleeve which meshes with one of the gears on the driven wheels, a counter-shaft journaled in the frame, different-sized gears fixed on the counter-shaft, a pinion on the counter-shaft which meshes with the internal gear, a third shaft, sleeves slidably mounted on the third shaft, pinions of different diameters on the sleeves, said pinions adapted to mesh with the different-sized gears on the counter-shaft, eccentric bearings for the third shaft, friction-wheels fixed to the third shaft, an engine-shaft, wheels secured thereto having rims and hubs, the friction-wheels being located intermediate the hubs and inner surface of the rims of the wheels on the engine-shaft and adapted for alternate contact therewith.

2. In a gear for traction-engines, the combination of a frame, an axle journaled in the frame, driven wheels secured to said axle, a gear fixed to each driven wheel, eccentric bearings, a shaft mounted in said eccentric bearings, different-sized gears and friction-wheels on the latter shaft, an engine-shaft, wheels mounted on the engine-shaft, the friction-wheels on the eccentrically-mounted shaft being located between the hubs and rims of the wheels on the engine-shaft, a counter-shaft, different-sized gears mounted on the counter-shaft, said latter gears adapted to mesh with the first-mentioned different-sized gears, a compensating-gear shaft, a pinion mounted on the latter shaft and meshing with the gear fixed to one of the driven wheels, an internal gear mounted on the compensating-gear shaft, a pinion on the counter-shaft, said latter pinion meshing with the internal gear, a sleeve on the compensating-gear shaft, a pinion mounted on the sleeve, said pinion meshing with the gear fixed to one of the driven wheels, a beveled gear mounted on the sleeve, a beveled-gear wheel revolving with the compensating-gear shaft, and a beveled pinion carried by the internal gear between the beveled gears on the sleeve and the compensating shaft.

3. In a gear for traction-engines, the combination of an axle, driven wheels mounted on said axle, gears on the driven wheels, a compensating-gear shaft, a pinion mounted on the compensating-gear shaft, said pinion meshing with one of the gears on the driven wheels, a sleeve, a pinion on the sleeve, said pinion meshing with one of the gears on the driven wheels, a counter-shaft, a pinion on the counter-shaft, a series of different-sized gears on the counter-shaft, gearing interposed between the pinion on the counter-shaft and the pinions on the sleeve and compensating-gear shaft to revolve the latter and the sleeve, a shaft, a series of different-sized pinions on the latter shaft adapted to mesh with the different-sized gears on the counter-shaft, friction-wheels on the shaft carrying the different-sized pinions, an engine-shaft, wheels with rims and hubs mounted on the engine-shaft, and means for engaging the friction-wheels with the hubs or rims of the wheels on the engine-shaft.

In testimony whereof I have signed my name to this specification in presence of two witnesses.

AMOS HARROLD.

Witnesses:
 JNO. IMNIE,
 F. W. BOND.